(12) United States Patent
Guang et al.

(10) Patent No.: US 7,905,791 B2
(45) Date of Patent: Mar. 15, 2011

(54) CONTROL DEVICE FOR A SWING

(75) Inventors: Feng Pei Guang, Zhongshan (CN); Wu Shu Peng, Zhongshan (CN); Peter D. Jackson, Alpharetta, GA (US); Jason P. Cooper, Atlanta, GA (US)

(73) Assignee: Kids II, Inc.

( * ) Notice: Subject to any disclaimer, the term of this patent is extended or adjusted under 35 U.S.C. 154(b) by 382 days.

(21) Appl. No.: 12/228,070

(22) Filed: Apr. 11, 2008

(65) Prior Publication Data

US 2009/0111593 A1    Apr. 30, 2009

Related U.S. Application Data

(60) Provisional application No. 61/123,898, filed on Apr. 11, 2008.

(51) Int. Cl.
  *A63G 9/16* (2006.01)
  *A63G 9/00* (2006.01)
(52) U.S. Cl. ........................................ 472/119; 340/671
(58) Field of Classification Search .......... 472/118–125; 297/273; 340/671, 672, 686.2, 686.3
  See application file for complete search history.

(56) References Cited

U.S. PATENT DOCUMENTS

| | | | |
|---|---|---|---|
| 3,842,450 A | 10/1974 | Pad | |
| 3,849,812 A | 11/1974 | Walsh | |
| 4,491,317 A | 1/1985 | Bausal | |
| 4,590,631 A | 5/1986 | Varney | |
| 4,616,824 A | 10/1986 | Quinlan, Jr. et al. | |
| 4,722,521 A | 2/1988 | Hyde et al. | |
| 4,730,176 A | 3/1988 | Matsuo et al. | |
| 4,785,678 A | 11/1988 | McGugan et al. | |
| 4,805,902 A | 2/1989 | Casagrande | |
| 4,904,926 A | 2/1990 | Pasichinskyj | |
| 4,911,498 A | 3/1990 | Becher et al. | |
| 4,934,981 A | 6/1990 | Stulbach | |
| 4,945,269 A | 7/1990 | Kamm | |
| 4,947,883 A | 8/1990 | Mayo | |
| 4,978,166 A | 12/1990 | James | |
| 5,007,671 A | 4/1991 | Oprea | |
| 5,048,135 A | 9/1991 | Chen | |
| 5,063,912 A | 11/1991 | Hughes | |
| 5,074,616 A | 12/1991 | Smith | |
| 5,083,773 A | 1/1992 | Saint | |
| 5,307,531 A | 5/1994 | Kao | |
| 5,335,163 A | 8/1994 | Siersen | |
| 5,363,871 A | 11/1994 | Garrand et al. | |

(Continued)

FOREIGN PATENT DOCUMENTS

CN    ZL200420006361.9    5/2005

(Continued)

*Primary Examiner* — Kien T Nguyen
(74) *Attorney, Agent, or Firm* — Alston & Bird, LLP

(57) ABSTRACT

Various embodiments of the invention include a motor system for driving a swing and controlling the speed and/or amplitude of the swing. In one embodiment, the motor system includes a DC motor, a swing velocity sensor system, and a swing velocity control circuit. The DC motor drives the swing through at least one fill swing cycle, and then the motor is allowed to free-wheel for at least a half swing cycle. During the free-wheeling half cycle, the swing velocity sensor system measures the velocity of the swing and compares the measured velocity to a goal velocity. The control circuit increases or decreases the velocity depending on this comparison. In other embodiments, the system includes a swing amplitude sensor system that measures the amplitude of the swing and a swing amplitude control circuit that compares the measured amplitude to a goal amplitude.

23 Claims, 9 Drawing Sheets

U.S. PATENT DOCUMENTS

| | | | |
|---|---|---|---|
| 5,378,196 A | 1/1995 | Pinch et al. |
| 5,394,131 A | 2/1995 | Lungu |
| 5,464,381 A | 11/1995 | Wilson |
| 5,525,113 A | 6/1996 | Mitchell et al. |
| 5,574,339 A | 11/1996 | Kattwinkel et al. |
| 5,586,351 A | 12/1996 | Ive |
| 5,608,366 A | 3/1997 | Sako |
| 5,660,597 A | 8/1997 | Fox et al. |
| 5,694,030 A | 12/1997 | Sato et al. |
| 5,769,727 A | 6/1998 | Fair et al. |
| 5,803,817 A | 9/1998 | Stern |
| 5,833,545 A | 11/1998 | Pinch et al. |
| 5,846,136 A | 12/1998 | Wu |
| 5,916,828 A | 6/1999 | Messner |
| 5,975,631 A | 11/1999 | Fair et al. |
| 5,984,791 A | 11/1999 | Fair et al. |
| 6,012,756 A | 1/2000 | Clark-Dickson |
| 6,022,277 A | 2/2000 | Jankowski |
| 6,027,163 A | 2/2000 | Longenecker |
| 6,027,409 A | 2/2000 | Favorito et al. |
| 6,059,667 A | 5/2000 | Pinch |
| 6,129,416 A | 10/2000 | Krueger et al. |
| 6,155,976 A | 12/2000 | Sackner et al. |
| 6,170,910 B1 | 1/2001 | Bapst |
| 6,193,224 B1 | 2/2001 | Dillner et al. |
| 6,246,561 B1 | 6/2001 | Flynn |
| 6,319,138 B1 | 11/2001 | Fair et al. |
| 6,339,304 B1 | 1/2002 | Allison et al. |
| 6,361,446 B2 | 3/2002 | Lawson et al. |
| 6,362,718 B1 | 3/2002 | Patrick et al. |
| 6,378,940 B1 | 4/2002 | Longoria et al. |
| 6,383,085 B1 | 5/2002 | Tseng |
| 6,431,646 B1 | 8/2002 | Longoria |
| 6,511,123 B1 | 1/2003 | Sitarski et al. |
| 6,580,190 B2 | 6/2003 | Takasu |
| 6,692,368 B1 | 2/2004 | Hyun |
| 6,710,476 B2 | 3/2004 | Tanozaki et al. |
| 6,739,659 B2 | 5/2004 | Dukes |
| 6,764,133 B2 | 7/2004 | Osato |
| 6,774,589 B2 | 8/2004 | Sato et al. |
| 6,802,328 B2 | 10/2004 | Lin |
| 6,814,670 B2 | 11/2004 | Morita et al. |
| 6,824,473 B2 | 11/2004 | Wu |
| 6,869,368 B1 | 3/2005 | Clarke et al. |
| 6,875,117 B2 | 4/2005 | Rausil et al. |
| 6,884,226 B2 | 4/2005 | Pereira |
| 6,896,624 B2 | 5/2005 | Longenecker et al. |
| 6,902,489 B2 | 6/2005 | Greger et al. |
| 6,908,397 B2 | 6/2005 | Armbruster et al. |
| 6,908,398 B1 | 6/2005 | Kang |
| 6,916,249 B2 | 7/2005 | Meade |
| 6,921,131 B2 | 7/2005 | Horvath et al. |
| 6,939,194 B2 | 9/2005 | Bapst et al. |
| 7,000,625 B2 | 2/2006 | Dickson et al. |
| 7,011,363 B1 | 3/2006 | Commery |
| 7,052,403 B2 | 5/2006 | Rausil et al. |
| 7,081,052 B2 | 7/2006 | Greger et al. |
| 7,118,173 B2 | 10/2006 | Kassai et al. |
| 7,134,714 B1 | 11/2006 | Commery |
| 7,211,974 B2 | 5/2007 | Takeuchi |
| 7,219,959 B2 | 5/2007 | Rausil et al. |
| 7,275,996 B2 | 10/2007 | Dillner et al. |
| 7,354,352 B2 | 4/2008 | Keska et al. |
| 7,493,666 B2 | 2/2009 | Michell |
| 2004/0102253 A1 | 5/2004 | Rausil et al. |
| 2005/0091744 A1 | 5/2005 | Mayyak |
| 2005/0239565 A1 | 10/2005 | Rausil et al. |
| 2005/0283908 A1 | 12/2005 | Wong et al. |
| 2006/0019760 A1 | 1/2006 | Keska et al. |
| 2006/0030415 A1 | 2/2006 | Waldman et al. |
| 2006/0111194 A1 | 5/2006 | Dillner et al. |
| 2006/0128486 A1 | 6/2006 | Tuckey |
| 2007/0010338 A1 | 1/2007 | Wu et al. |
| 2007/0049390 A1 | 3/2007 | Wu et al. |
| 2007/0207870 A1 | 9/2007 | Armbruster et al. |
| 2008/0194349 A1 | 8/2008 | Kwon |

FOREIGN PATENT DOCUMENTS

| | | |
|---|---|---|
| CN | 200730057030.7 | 6/2007 |
| CN | 200710029330.3 | 7/2007 |

CONTROL DEVICE FOR A SWING

CROSS REFERENCE TO RELATED APPLICATIONS

This application is a conversion to a nonprovisional application under 35 U.S.C. §111(b)(5) and 37 C.F.R. §1.53(c)(3) of U.S. provisional application No. 61/123,990, entitled "Speed and Oscillation Control Device for an Infant Swing", filed on Apr. 11, 2008. This application also claims priority to U.S. provisional application No. 61/123,898 entitled "Amplitude Control Device for an Infant Swing" filed Apr. 11, 2008, which is herein incorporated by reference in its entirety.

BACKGROUND OF THE INVENTION

Infant swings, as well as the motor systems that control them, are well documented in the art. Traditionally, a swing consists of a seat which is supported at the distal end of one or more swing arms. A direct current (DC) motor is affixed between the support fame and swing arm such that the motor provides torque on one of the swing arms (the other being passively driven) to create the swinging motion of the seat. Existing art describes motor controllers that allow for a plurality of motion profiles which could be adjusted by means of a user interface. Previously, this was done by providing the motor with multiple, predetermined amounts of voltage, each producing a different torque from the motor and each corresponding to a motion profile. However, a swing operates on the principles of simple pendulum, and as such, the torque required from the motor to maintain a selected speed depends directly on the weight and location of the child in the seat. As a result, constant torque swings, although producing different motion profiles at each setting, also produce varying motion profiles for the same speed under different loading conditions, e.g., different sized children.

In an attempt to produce a consistent motion profile for each setting, under any loading condition, more recent art describes a feedback system which monitors the swing height at the end of each cycle and compares it to the desired swing height for the motion profile selected by the user. By comparing the desired swing arc with the actual swing arc, the motor controller can adjust the voltage to the motor and thus the torque it provides on the successive swings. This system, while providing a more consistent motion profile under various loading conditions for the same swing, still operates under the principles of pendulum, and as such, the speed of the seat increases as it moves away from the endpoints of the motion path. Because this system is limited to varying the motor torque once per cycle, the motor provides an inconsistent velocity profile over the motion path, resulting in peak and valley type velocity changes.

BRIEF SUMMARY OF VARIOUS EMBODIMENTS OF THE INVENTION

Various embodiments of the invention include a motor driven infant or child swing and means for regulating the swinging motion of the swing. In particular, according to various embodiments, the swing includes a feedback system that provides a more consistent motion profile under any loading condition as well as a smoother velocity profile over the motion path. In particular embodiments, the swing produces a steady velocity over the entire motion path, which produces a smoother and gentler motion that results in a more calming effect than the swinging motions presented in existing an. Various embodiments also allow a user to select from a plurality of motion profiles, and the swing achieves the selected motion profile by comparing the measured velocity of the swing to a unique goal velocity associated with the selected motion profile. The selected motion profile is achieved, according to various embodiments, for any preprogrammed motion profile independent of the angle of travel by the pendulum or its direction.

Various embodiments of the present invention concern the motor system that produces the rocking motion in an infant or child swing, and more specifically, the motor control system which regulates the motion path of the swing. In various embodiments, the swing includes a base frame that is supported on the ground. The base frame includes a plurality of uprights extending from the base, and a plurality of swing arms are pivotably mounted to the uprights of the base frame at a connection point. A seat is mounted to the swing arms below the connection point. In a particular embodiment, each swing arm supports each side of the seat. A DC motor is affixed to the base frame, and a motor shah of the motor provides a torque to one or more swing arms about the connection point.

According to various embodiments, the motor system includes the DC motor, a voltage supply, and a motor controller. The motor controller is used to regulate the voltage supplied to the motor. In one embodiment, motor feedback is provided by a light interrupter detector consisting of a slotted disk and an optical source/sensor. The slotted disk is mounted either directly to the motor shaft or indirectly as by a gear box or the like. The optical source and sensor are positioned such that the slots in the disk interrupt the light from the source on its path to the sensor intermittently as the motor shaft and disk rotate. The time between interrupts in the optical source/sensor path are measured by a microprocessor in the motor controller and compared with the goal time for the selected motion profile, as this time corresponds to the velocity of the motor. As such, the microprocessor either increases or decreases the voltage provided to the motor, which increases or decreases the torque generated by the motor. This voltage adjustment allows the velocity of the swing to approach and/or match the goal velocity.

In various embodiments, the number of feedback samples per cycle will vary based on the geometry of the slotted disk as well as the magnitude of the motion profile. Because the swing system operates based upon the principle of a simple pendulum, the swing must effectively come to a stop at the endpoints of the motion path. As such, the velocity of the seat, despite an increase in voltage to the motor, deviates increasingly from the goal velocity as the swing nears the endpoints of the motion path. This deviation is read by the microprocessor as an increased time between interrupts such that when this deviation becomes significantly large (effectively equal to the negative value of the goal speed), the voltage supplied to tie motor is reversed as is the resultant torque provided by the motor. In this manner, the velocity profile is held relatively constant as the swing moves back and forth along the motion path.

Various embodiments may include variations in the shape, material, construction method, and size of the base frame, swing arms, and seat structures. Various embodiments may also allow for variations in the design of the electronic components used in conjunction with the motor controller. For example, in one embodiment, the swing may include a user interface system that allows a user to select one of a plurality of motion profiles of the swing and a duration of the swinging motion. In various embodiments, the user interface may be adjusted by means of mechanical or electrical switches, and the user interface system may be mounted on the support structure. In addition, various embodiments of the swing include toys or music for entertaining a child seated in the swing.

BRIEF DESCRIPTION OF THE DRAWINGS

Figure 1:
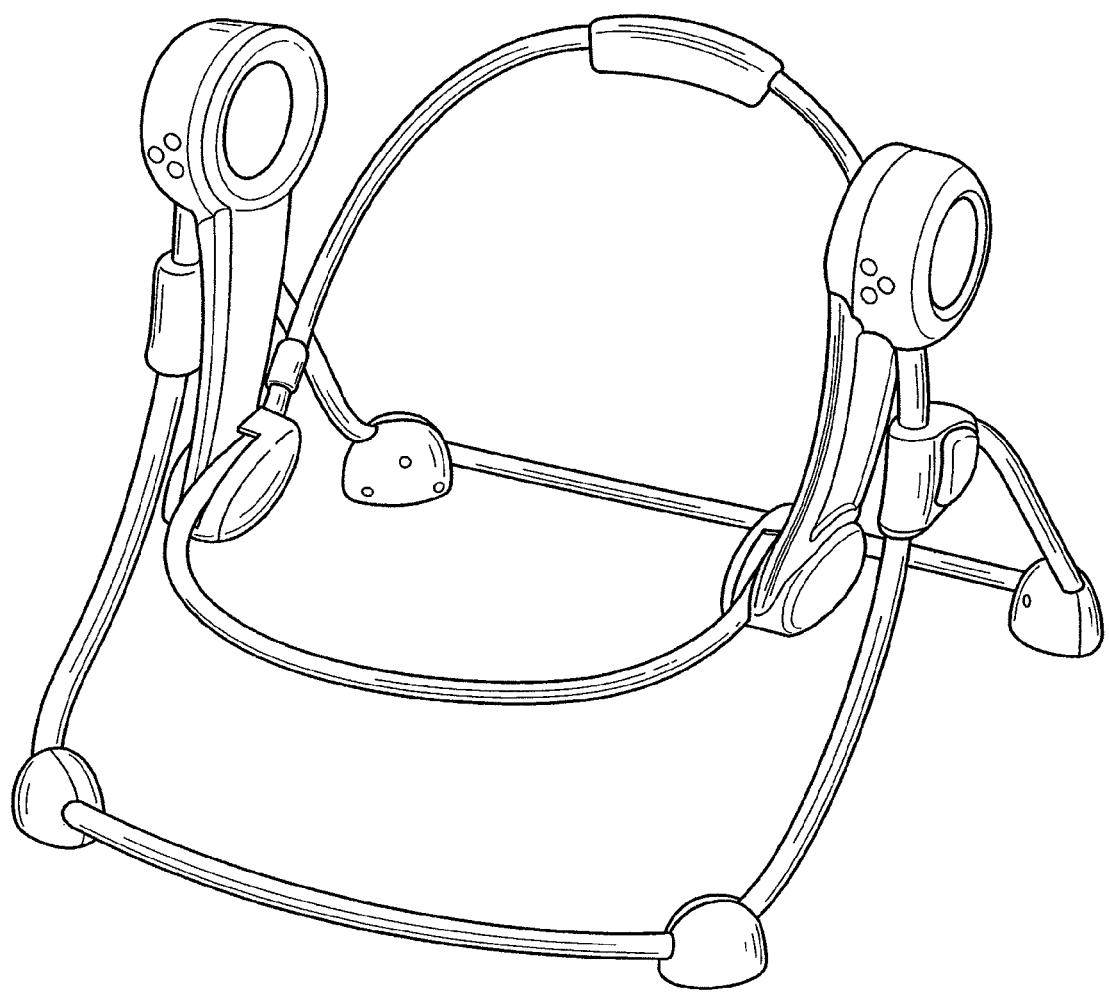

Having thus described various embodiments of the invention in general terms, reference will now be made to the accompanying drawings, which are not necessarily drawn to scale, and wherein:

FIG. 1 illustrates an infant swing according to various embodiments of the invention.

Figure 2:
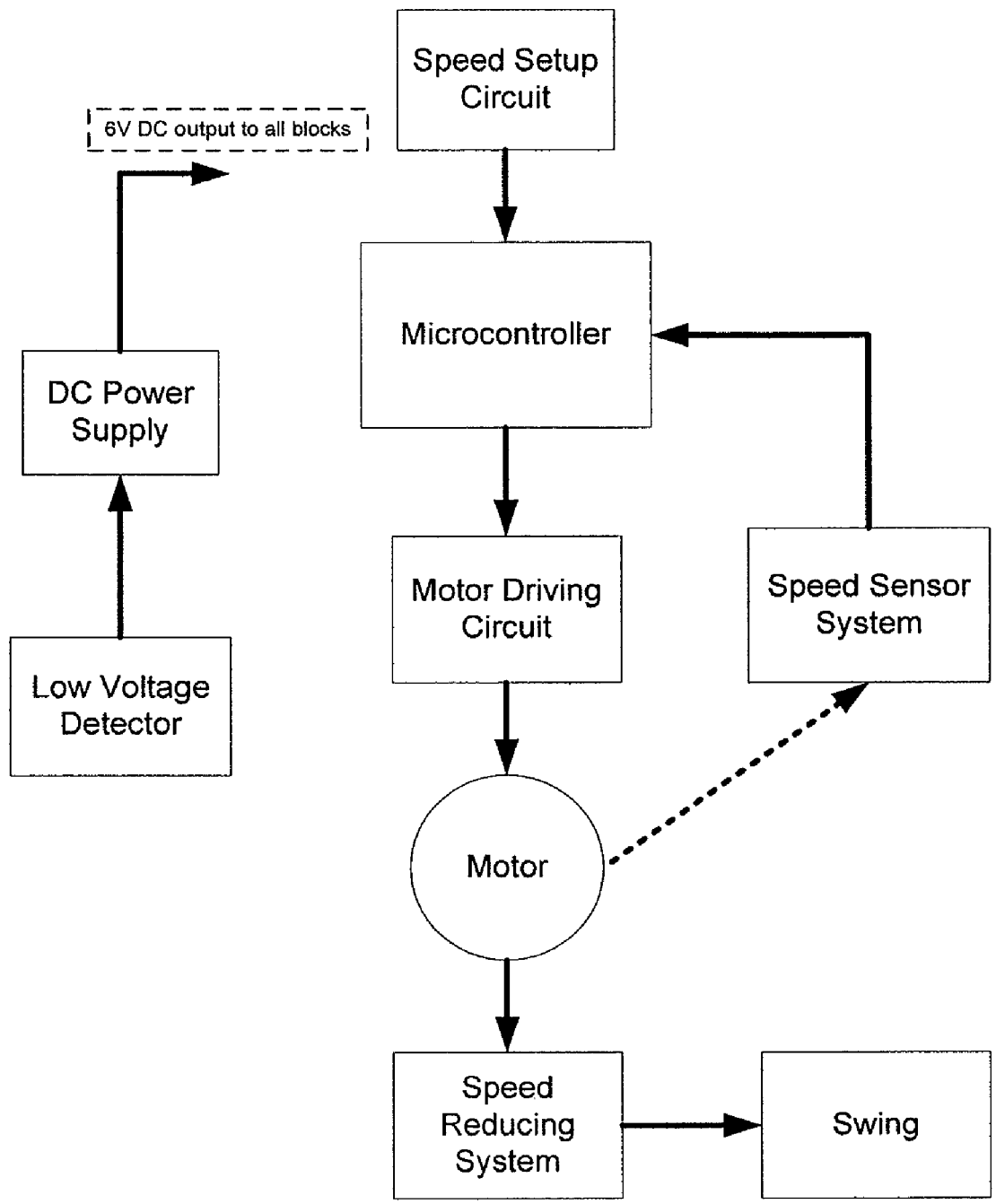

FIG. 2 illustrates a diagram of a speed swing controller according to various embodiments of the invention.

Figure 3:
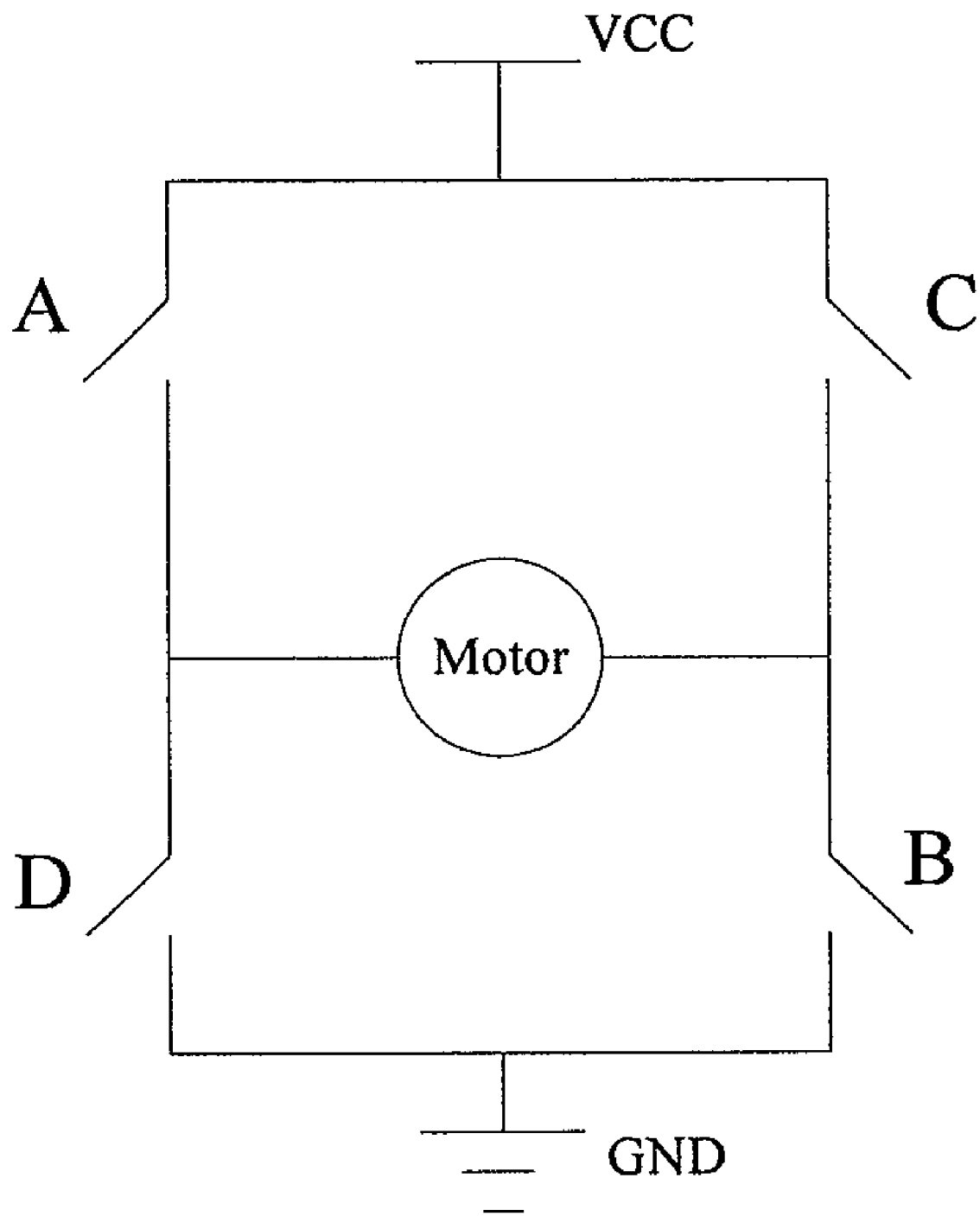

FIG. 3 illustrates an embodiment of a motor driving circuit according to various embodiments of the invention.

Figure 4:
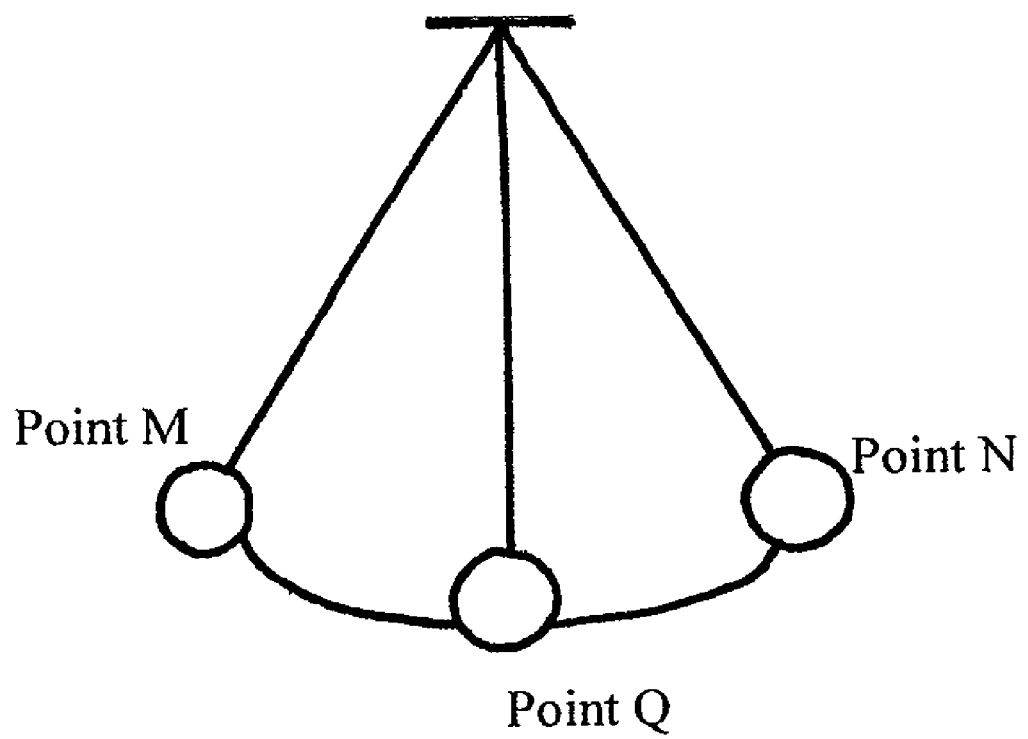

FIG. 4 illustrates a diagram of a swing arc traveled by the swing according to various embodiments.

Figure 5:
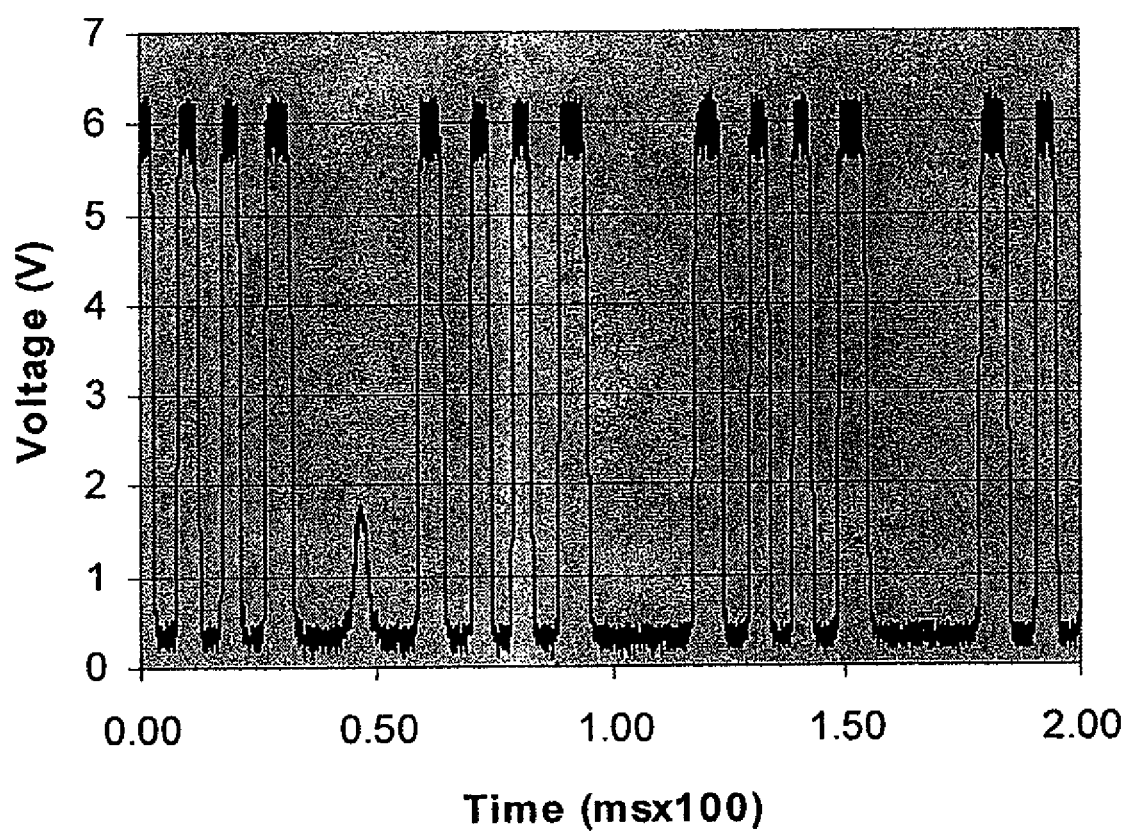

FIG. 5 is an encoder waveform recorded by an oscilloscope indicating generally the characterization of the pulse train according to various embodiments.

Figure 6:
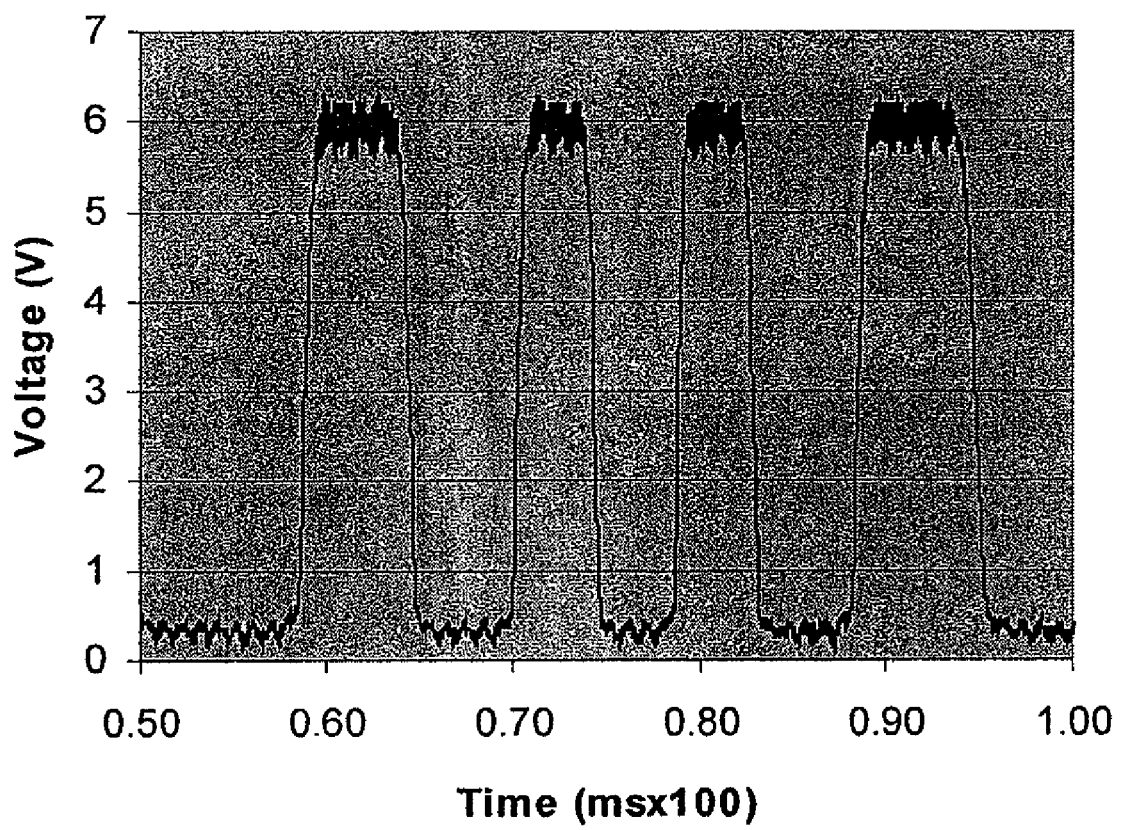

FIG. 6 illustrates an expanded view of the encoder waveform of one half of the swing cycle shown FIG. 5.

Figure 7:
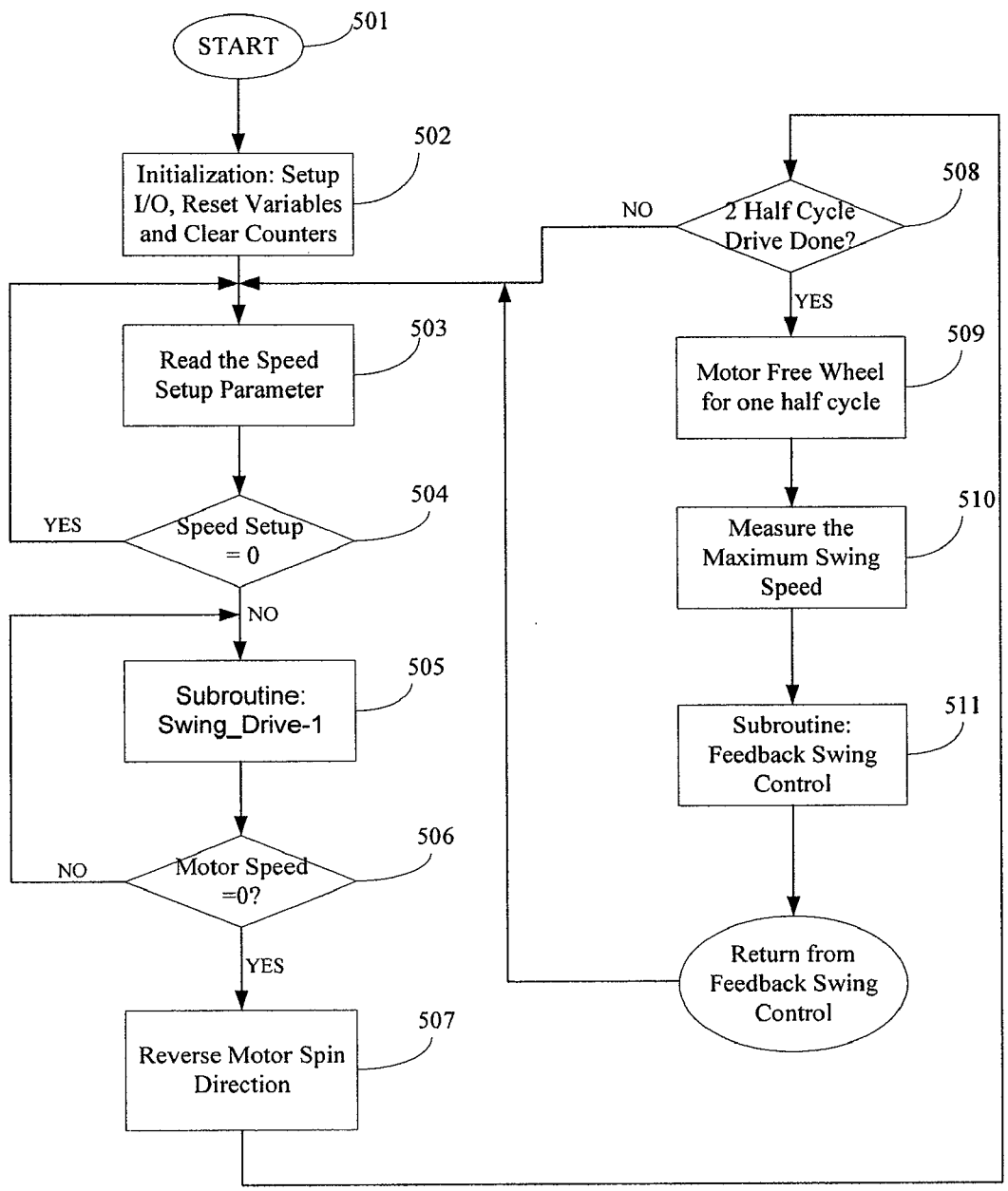
Figure 8:
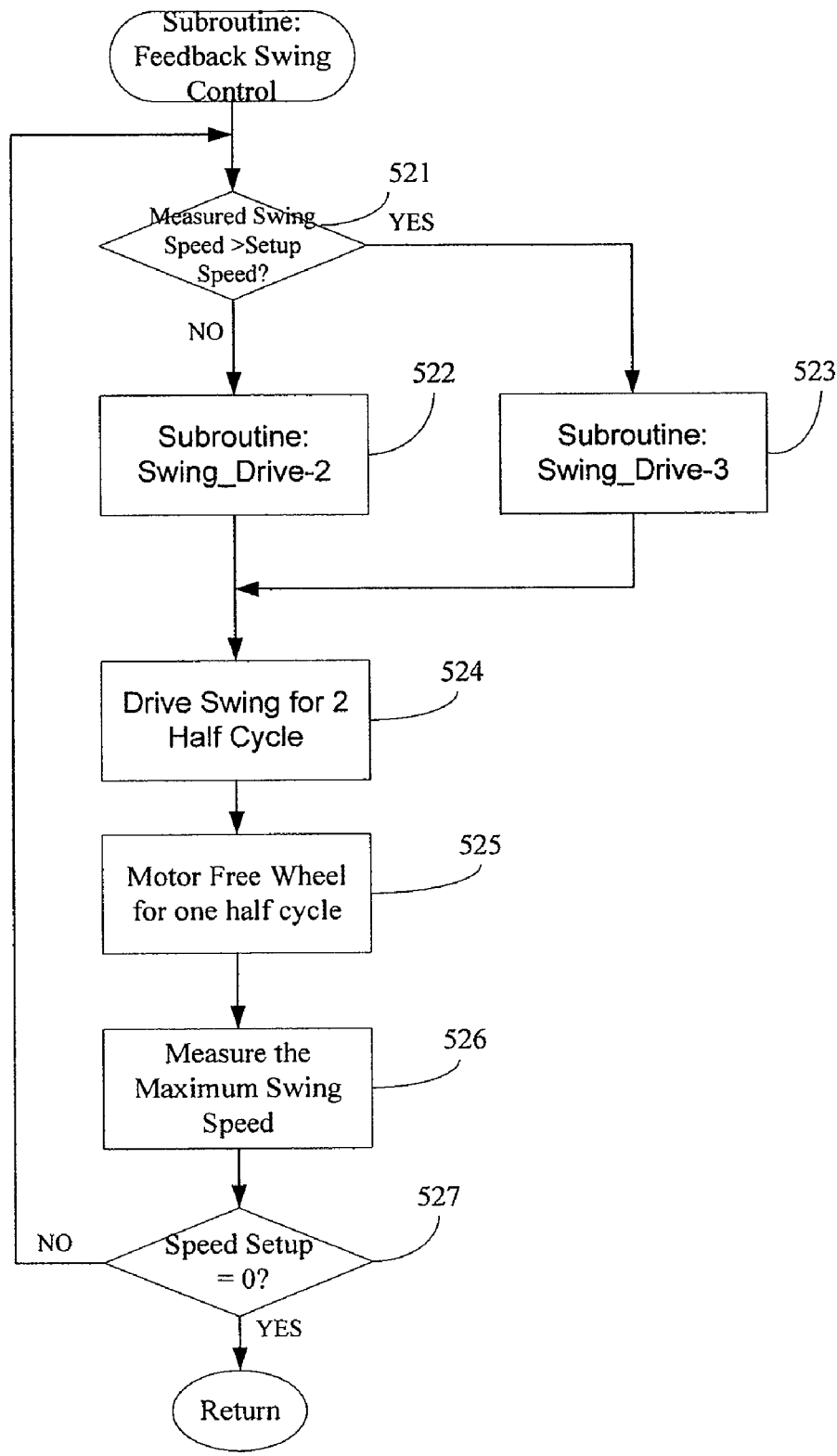

FIG. 7 illustrates a flow diagram of a software algorithm executed by the controller shown FIG. 2 according to one embodiment of the invention FIG. 8 illustrates a flow chart of the Feedback Swing Control subroutine called in step 511 of FIG. 7 according to one embodiment of the invention.

Figure 9:
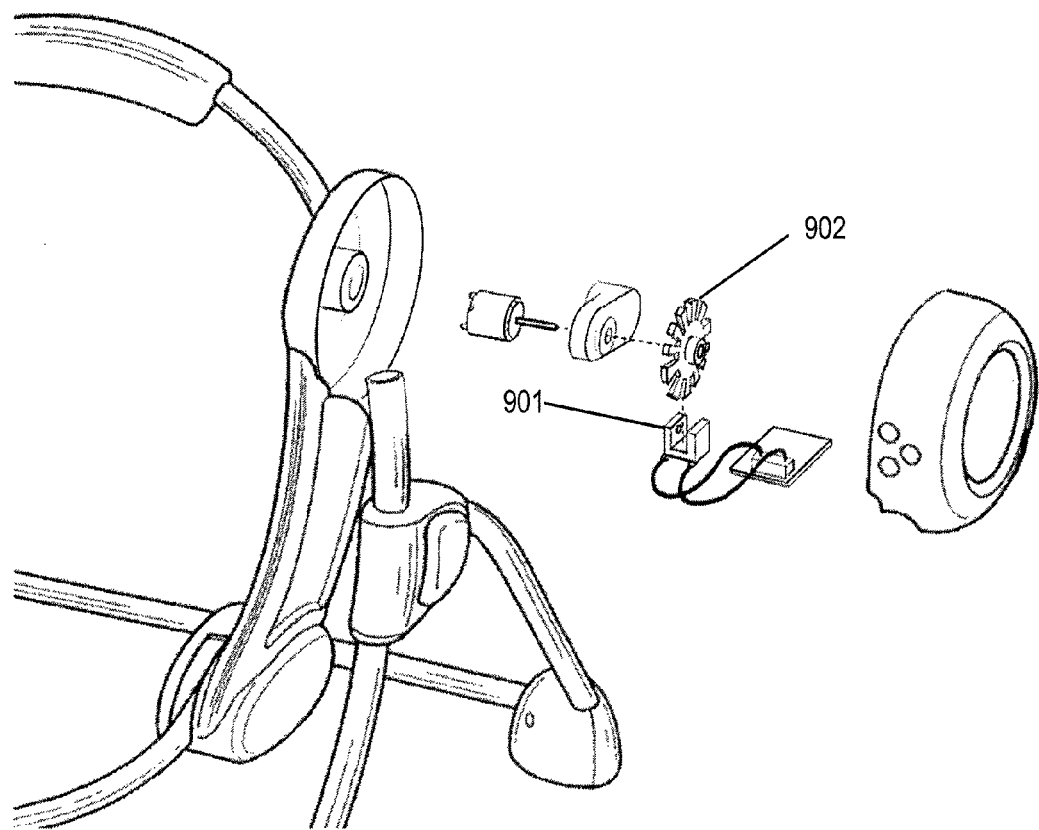

FIG. 9 illustrates an exploded view of an encoder wheel and optical sensor assembly according to one embodiment of the invention.

DETAILED DESCRIPTION OF VARIOUS EMBODIMENTS OF THE INVENTION

Various embodiments of the invention are described more fully hereinafter with reference to the accompanying drawings, in which some, but not all embodiments of the invention are shown in the figures. Indeed, these inventions may be embodied in many different forms and should not be construed as limited to the embodiments set forth herein; rather, these embodiments are provided so that this disclosure will satisfy applicable legal requirements.

FIG. 1 illustrates one embodiment of the invention. As shown, an infant swing includes a seat that is mounted to a pair of swing arms that are pivotably mounted to the right and left apices of a base frame, typically referred to as an "A" frame, in which the base, in profile view appears to be an "A" or inverted "V" shape. Further, as there is no fixed, rigid member transversely mounted to the right and left apex, the frame style is referred to as an "open top". Although shown with a particular type of swing, various embodiments of the invention could include other swing types, such as glider swings.

FIG. 2 illustrates a diagram of a speed swing controller according to various embodiments of The invention. The swing speed controller includes: a 6V direct current (DC) power supply, a DC motor, a speed-reducing system (e.g., transmission), a speed sensing system, and an electronic control unit. The DC power supply can be alkaline battery, rechargeable battery, or 6V, DC output from ml AC-DC power converter plugged into an 110V wall outlet The speed-reducing system transfers the motor power to the swing to mobilize the swing in a fore and aft direction. In one embodiment, the transmission includes a speed-reduction gear-set.

The speed sensor system provides a means to measure the swing speed and output an electrical signal representative of the swing speed. For example, in the embodiment illustrated in FIG. 9, the speed sensor system comprises an optical sensor 901 and an encoder wheel 902. The optical sensor 901 includes a light source and a photodiode. The output signal of the photodiode corresponds to the swing speed information, and this output signal is input to the electronic control circuit. In one embodiment, the encoder wheel is installed directly to one end of the motor shaft. However, in an alternative embodiment, the encoder wheel is mounted on the swing shaft to directly measure swing speed. In addition, in other embodiments, the speed sensor system includes other types of sensors, such as magnetic sensors, for example.

According to various embodiments, the electronic control circuit block includes a micro-controller, a motor driving circuit, a speed setup circuit, and a low voltage detector. The micro-controller may be chosen from any of a number of available, 8 bit micro-controller commercial products which include a central processing unit (CPU), a read only memory (ROM) in which to store the software program, a random access memory (RAM) and input/output (I/O) ports.

FIG. 3 illustrates an embodiment of the motor driving circuit, which interfaces with the DC motor. In the embodiment in FIG. 3, the motor driving circuit is implemented using an H-bridge circuit that has four switches, transistors, or other means of completing a circuit so as to drive the DC motor. The switches are labeled A, B, C, and D in FIG. 3. Each of the four switches can be either open or closed, resulting in a total of sixteen possible switch settings. Table 1 below lists three combinations that are useful in one embodiment of the invention. By controlling the switches on/off in different combinations, the DC motor can be driven forward or backward or allowed to freewheel to mobilize the swing in accordance with the desired operation.

TABLE 1

The combination of the switches for motor driving

| Closed switches | Polarity | Effect |
| --- | --- | --- |
| A & B | forward | motor spins forward |
| C & D | reverse | motor spins backward |
| None | Free | motor floats freely |

The speed setup circuit allows a user to input the desired swing speed. For example, in one embodiment, the speed setup circuit includes six speeds and an "off" position that can be selected by the user. By using the hardware components identified above, the speed controlled swing can swing at one of six speeds selected by the user.

A low voltage detector circuit is also implemented with the speed setup circuit to monitor the voltage of DC power supply when battery powered. The low voltage detection functions as an electronic switch, and once the power supply voltage drops below a predetermined level, the low voltage detector shuts down the DC power supply.

FIG. 4 illustrates a diagram of the swing arc traveled by the swing according to various embodiments. Points M and N represent the highest swing positions, and the swing speed approaches zero at these points. Point Q represents the point at which the swing is perpendicular with the ground line, and the speed of the swing is greatest at this point in the swing arc. According to one embodiment, the motor shaft is driven through at least one full swing cycle (from M to N and back to M), and then the motor is allowed to rotate freely through at least one half of the next swing cycle. In one embodiment, the motor is driven by pulse width modulation (PWM) for one full cycle and is then allowed to free-wheel for a half swing cycle. Alternatively, the motor can be driven by PWM for a half swing cycle and allowed to free wheel for another half cycle or be driven by PWM for one and a half swing cycles and free-wheel for the next half cycle.

The swing speed is measured at the point at which the swing is perpendicular to the ground line, represented by Point Q, when the motor is free-wheeling, according to one embodiment. The speed measurement and characterization is carried out by the speed sensor system. According to the embodiment shown in FIG. 5, the output of the speed sensor system is a series of pulses or "pulse train" that contain the swing speed information. The pulses are represented by output signals from the sensor resulting from the rotation of the encoder wheel relative to the sensor. Because the encoder wheel rotates proportionally to the swing, the pulses output by the sensor correspond to the movement of the swing. In one embodiment, the teeth of the encoder wheel are evenly distributed, and the pulse widths of all pulses are the same in the entire pulse train if the swing runs at a constant speed. However, as the swing moves from speed zero (points M or N) to maximum speed (point Q) and returns to zero (points N or M), the pulse width varies proportionally to the swing speed. This variation provides the opportunity to acquire the swing speed information. In particular, in one embodiment, the pulse width is measured when the photodiode output is at logic low (e.g., less light is received by the photodiode because slots extending from the encoder wheel prevent the transmission of light from the light emitter to the photodiode).

FIG. 5 is an encoder waveform recorded by an oscilloscope indicating generally the characterization of the pulse train according to various embodiments. The time between the two widest pulses represents the half cycle of the swing traveling from points M to N in FIG. 4. FIG. 6 illustrates an expanded view of the encoder waveform of one half of the swing cycle shown FIG. 5 between the time duration of 50-100 ms. This expanded view more clearly The micro-controller can determine swing cycles by continuously measuring motor speed. When the swing oscillates upward and is acted on by gravitational force, the swing speed begins to slow down and approaches zero speed. As the swing speed approaches zero at the top of its trajectory, the control circuit can react to the monitoring device's corresponding signal and reverse the direction of the transmission motor. Furthermore, when the swing travels downward, its speed increases from zero to a maximum value, and the monitoring device continually transmits this corresponding speed signal to the control circuit. The control circuit processes the monitoring device's speed signal continuously and when that speed value reaches a maximum, the control circuit can compare the value to a set-up maximum value and adjust the transmission motor's output accordingly. By measuring swing speed and controlling the rotating shaft that drives the oscillating swing seat, the control circuit can drive the swing uniformly and continuously in both directions.

The swing speed information is represented by the shortest pulse width of a half swing cycle, and this information is received by the micro-controller as feedback information. Based on this information, the micro-controller regulates the PWM, which controls the current of the motor driving circuit, thus increasing or decreasing the motor torque delivered to the swing to maintain the selected swing speed. By this means, the swing is able to achieve and maintain the preferred motion under a variety of loads, as determined by the weight of the occupant.

FIG. 7 illustrates a flow diagram of a software module executed by the controller shown in FIG. 2, according to one embodiment of the invention. The module 501 begins at step 502 by setting up input/outputs (IYO), resetting variables, and clearing counters. Next, in step 503, the input port is read, which contains the speed setup information to be checked in step 504. If the speed setup is 0, there is no any action needed, and the module 501 keeps reading this input port and runs the loop between steps 503 and 504. Once the speed setup changes to any value among 1 to 6 (each of these values corresponding to each of a plurality of selected speeds or amplitudes for the swing), the program proceeds to step 505 and calls subroutine Swing_Drive-1. Subroutine Swing_Drive 1 produces moderate motor drive force, In step 5506, the motor speed will be checked to see if it reaches 0. If the motor speed is 0, in step 507, the motor will reverse spin direction to run for another half cycle. When finishing the second half cycle drive, the motor is then allowed to See wheel for a half cycle, as shown in step 509. In step 510, the maximum swing speed is measured. Following Step 510, the Feedback Swing Control subroutine is executed as shown in step 511 to maintain the expected setup swing speed.

FIG. 8 illustrates a flow chart of the Feedback Swing Control subroutine called in step 511 of FIG. 7. The swing close loop control is implemented in this program. In step 521 the measured swing speed is compared with the user setup speed. If the measured swing speed is faster than the user setup speed, subroutine Swing_Drive-3 is executed in step 523. If the measured swing speed is slower than the user speed setup, step 522 is executed. Subroutine Swing_Drive-3 provides a relatively low volume of motor current, and subroutine Swing_Drive-2 provides a relatively heavy volume of motor current. The volume of the current provided by subroutine Swing_Drive-1 is between the current provided by Subroutine Swing_Drive-3 and Subroutine Swing_Drive-2. Next, the motor drives the swing for two half cycles, as shown in step 524, and then the motor is allowed to free wheel for a half cycle, shown in step 525. During this free-wheeling half cycle, the maximum swing speed is measured, as shown in step 526. After measuring the maximum speed, the speed setup is rechecked in step 527 to see if the user changes it. If the speed setup changes to 0, the subroutine returns to the main program.

CONCLUSION

Although this invention has been described in specific detail with reference to the disclosed embodiments, it will be understood that many variations and modifications may be effected within the spirit and scope of the invention as described in the appended claims.

The invention claimed is:

1. A swing amplitude control device for controlling an amplitude of a swing, said swing being driven by a motor, said swing amplitude control device comprising:
    a swing amplitude sensor configured for outputting an electrical signal representative of an amplitude of said swing; and
    a swing amplitude control circuit configured for:
        receiving said electrical signal from said swing amplitude sensor;
        comparing said electrical signal with a goal amplitude signal;
        in response to said amplitude represented by said electrical signal from said swing amplitude sensor being greater than a goal amplitude represented by said goal amplitude signal, outputting a decrease signal to said motor to decrease said amplitude of said swing not more frequently than once every one and a half swing cycles; and in response to said amplitude represented by said electrical signal from said swing amplitude sensor being less than a goal amplitude represented by said goal amplitude signal, outputting an increase signal to said motor to increase said amplitude of said swing not more frequently than once every one and a half swing cycles.

2. A swing velocity control device for controlling a velocity of a swing, said swing being driven by a motor, said swing velocity control device comprising:

a swing velocity sensor configured for outputting an electrical signal representative of a velocity of said swing; and a swing velocity control circuit configured for:
receiving said electrical signal from said swing velocity sensor;
comparing said electrical signal with a goal velocity signal;
in response to said velocity represented by said electrical signal from said swing velocity sensor being greater than a goal velocity represented by said goal velocity signal, outputting a decrease signal to said motor to decrease said velocity of said swing not more frequently than once every one and a half swing cycles; and
in response to said velocity represented by said electrical signal from said swing velocity sensor being less than a goal velocity represented by said goal velocity signal, outputting an increase signal to said motor to increase said velocity of said swing not more frequently than once every one and a half swing cycles.

3. A swing velocity control device for controlling a velocity of a swing, said swing being driven by a motor, said swing velocity control device comprising:

a swing velocity sensor system comprising:
a presence/absence sensor; and
a slotted disk having a plurality of radially projecting, circumferentially spaced prongs, said slotted disk configured to rotate with said swing, wherein said presence/absence sensor is configured for outputting an electrical signal in response to at least one of said prongs moving adjacent the sensor;
a swing velocity control circuit configured for:
receiving said electrical signals from said presence/absence sensor;
measuring a time interval corresponding to one or more successive said electrical signals and representative of a velocity of said swing;
comparing a shortest measured time interval with a goal time interval;
in response to said shortest measured time interval being greater than said goal time interval, outputting a decrease signal to said motor to decrease said velocity of said swing not more frequently than once every one and a half swing cycles; and
in response to said shortest measured time interval being less than said goal time interval, outputting an increase signal to said motor to increase said velocity of said swing not more frequently than once every one and a half swing cycles.

4. The swing velocity control device of claim 3 wherein said slotted disk is mounted on an end of a shaft of said motor.

5. The swing velocity control device of claim 3 wherein said slotted disk is mounted on an end of a shaft of said swing.

6. The swing velocity control device of claim 3 wherein said presence/absence sensor comprises an optical sensor configured to output said electrical signal in response to said optical sensor receiving a low level of light.

7. The swing velocity control device of claim 3 wherein said presence/absence sensor comprises a magnetic proximity sensor.

8. The swing velocity control device of claim 3 wherein said swing velocity control circuit is further configured for driving said motor for one full cycle and then allowing it to freewheel for a half cycle.

9. The swing velocity control device of claim 8 wherein said swing velocity control circuit is further configured for comparing said shortest measured time interval with said goal time interval during said freewheeling half cycle.

10. The swing velocity control device of claim 3 wherein said swing velocity control circuit is further configured for driving said motor for one and a half cycles and then allowing it to freewheel for a half cycle.

11. The swing velocity control device of claim 10 wherein said swing velocity control circuit is configured for comparing said shortest measured time interval with said goal time interval during said freewheeling half cycle.

12. The swing velocity control device of claim 3 wherein said swing velocity control circuit comprises a microprocessor.

13. The swing velocity control device of claim 3 wherein said goal time interval corresponds to one of a plurality of velocities selectable by a user.

14. The swing velocity control device of claim 13 further comprising a user interface through which said user can select from said plurality of velocities, said user interface being in communication with said swing velocity control circuit.

15. The swing velocity control device of claim 3 wherein said decrease signal comprises a shorter pulse width modulation signal and said increase signal comprises a longer pulse width modulation signal.

16. The swing velocity control device of claim 3 wherein said electrical signals are pulses, and said measured time interval is measured by identifying a width of each of said pulse signals.

17. The swing velocity control device of claim 3 wherein said electrical signals are pulses, and said measured time interval is measured by identifying a width between successive pulse signals.

18. The swing velocity control device of claim 3 wherein said swing velocity control circuit is further configured for driving said motor for at least one full swing cycle and then allowing said motor to free-wheel through at least half of a swing cycle, and said swing velocity control circuit is configured for comparing said shortest measured time interval with said goal time interval during said freewheeling half cycle.

19. A swing amplitude control device for controlling an amplitude of a swing, said swing being driven by a motor along a swing path defining opposed end points at which said swing changes direction and a center portion there between in which said swing reaches its maximum angular velocity, said swing amplitude control device comprising:

a swing amplitude sensor configured for:
sensing the velocity of said swing in said center portion of said swing's path; and
outputting an electrical signal indicative of an amplitude of said swing based on said sensed velocity of said swing; and a swing amplitude control circuit configured for:
  receiving said electrical signal from said swing amplitude sensor;
  comparing said electrical signal with a goal amplitude signal;
  in response to said electrical signal from said swing amplitude sensor indicating an amplitude greater than said amplitude indicated by said goal amplitude signal, outputting a decrease signal to said motor to decrease said amplitude of said swing; and
  in response to said electrical signal from said swing amplitude sensor indicating an amplitude less than said amplitude indicated by said goal amplitude signal, outputting an increase signal to said motor to increase said amplitude of said swing.

20. The swing amplitude control device of claim 19, wherein:
  said swing amplitude control circuit is further configured for allowing said motor to freewheel for a certain amount of time; and
  said swing amplitude sensor is further configured for sensing the velocity of said swing while said motor is freewheeling.

21. The swing amplitude control device of claim 19, wherein:
  said swing amplitude sensor is further configured for sensing the velocity of said swing when said swing is equidistant from said opposed end points of said swing path.

22. The swing amplitude control device of claim 19, wherein:
  said swing amplitude control circuit is configured for:
  outputting said decrease signal not more frequently than once every one and a half swing cycles; and
  outputting said increase signal not more frequently than once every one and a half swing cycles.

23. The swing amplitude control device of claim 19, wherein:
  the swing amplitude sensor comprises:
  a presence/absence sensor; and
  a slotted disk having a plurality of radially projecting, circumferentially spaced prongs, wherein said slotted disk is configured for rotating with said swing, and wherein said presence/absence sensor is configured for outputting an electrical signal in response to at least one of said prongs moving adjacent said presence/absence sensor.

* * * * *

UNITED STATES PATENT AND TRADEMARK OFFICE
CERTIFICATE OF CORRECTION

PATENT NO.         : 7,905,791 B2
APPLICATION NO.    : 12/228070
DATED              : March 15, 2011
INVENTOR(S)        : Guang et al.

It is certified that error appears in the above-identified patent and that said Letters Patent is hereby corrected as shown below:

Title Page,
Item (57) ABSTRACT
Various embodiments of the invention include a motor system for driving a swing and controlling the speed and/or amplitude of the swing. In one embodiment, the motor system includes a DC motor, a swing velocity sensor system, and a swing velocity control circuit. The DC motor drives the swing through at least one fill swing cycle, and then the motor is allowed to free-wheel for at least a half swing cycle. During the free-wheeling half cycle, the swing velocity sensor system measures the velocity of the swing and compares the measured velocity to a goal velocity. The control circuit increases or decreases the velocity depending on this comparison. In other embodiments, the system includes a swing amplitude sensor system that measures the amplitude of the swing and a swing amplitude control circuit that compares the measured amplitude to a goal amplitude." should read --(57) ABSTRACT
Various embodiments of the invention include a motor system for driving a swing and controlling the speed and/or amplitude of the swing. In one embodiment, the motor system includes a DC motor, a swing velocity sensor system, and a swing velocity control circuit. The DC motor drives the swing through at least one full swing cycle, and then the motor is allowed to free-wheel for at least a half swing cycle. During the free-wheeling half cycle, the swing velocity sensor system measures the velocity of the swing and compares the measured velocity to a goal velocity. The control circuit increases or decreases the velocity depending on this comparison. In other embodiments, the system includes a swing amplitude sensor system that measures the amplitude of the swing and a swing amplitude control circuit that compares the measured amplitude to a goal amplitude.--

Column 1
Line 21, "fame" should read --frame--

Column 1
Line 67, "an" should read --art--

Signed and Sealed this
Twenty-first Day of February, 2012

David J. Kappos
*Director of the United States Patent and Trademark Office*

CERTIFICATE OF CORRECTION (continued)
U.S. Pat. No. 7,905,791 B2

<u>Column 2</u>
Line 19, "shah" should read --shaft--

<u>Column 2</u>
Line 53, "tie" should read --the--

<u>Column 3</u>
Line 63, "ml" should read --an--

<u>Column 6</u>
Line 4, "(IYO)" should read --(I/O)--
Line 15, "5506" should read --506--
Line 18, "See" should read --free--